US006535968B2

United States Patent
Pham

(10) Patent No.: US 6,535,968 B2
(45) Date of Patent: *Mar. 18, 2003

(54) APPARATUS, SYSTEM, AND METHOD FOR REDUCING BUS CONTENTION DURING CONSECUTIVE READ-WRITE OPERATIONS

(75) Inventor: Binh Pham, Castro Valley, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/847,154

(22) Filed: May 1, 2001

(65) Prior Publication Data

US 2001/0016894 A1 Aug. 23, 2001

Related U.S. Application Data

(63) Continuation of application No. 09/209,974, filed on Dec. 10, 1998.

(51) Int. Cl.$^7$ .............................................. G06F 13/14
(52) U.S. Cl. ....................................................... 711/167
(58) Field of Search ................................ 711/104, 105, 711/167, 169

(56) References Cited

U.S. PATENT DOCUMENTS

| 5,783,949 A | 7/1998 | Reohr et al. |
| 5,933,385 A | 8/1999 | Jiang et al. |
| 6,003,118 A | 12/1999 | Chen |
| 6,052,738 A | 4/2000 | Muller et al. |
| 6,075,730 A | 6/2000 | Barth et al. |

OTHER PUBLICATIONS 2.25Mb Zero Bus Turnaround™ SRAM, by MICRON Technology, General Description of produc revised Feb. 1998, pp. 1–18. MT55L128L18P.

Technical Note: Designing with ZBT™ SRAMs, by MICRON Technology, revised Feb. 1998 pp. 1–5, TN–55–01.

Motorola Semiconductor Technical Data: Advance Information—128Kx36 and 256Kx18 Bit Pipelined ZBT™ RAM Synchronous Fast Static RAM, revised May 5, 1998, Motorola, Inc., pp. 1 MCM63Z736/D.

ZBT™ (Zero Bus Turnaround™) Synchronous SRAM Architecture: Application Note AN–163, published 1996, pp. 1–6. By Integrated Device Technology, Inc.

Primary Examiner—Kevin L. Ellis
(74) Attorney, Agent, or Firm—Meyertons Hood Kivlin Kowert & Goetzel, P.C.; B. Noël Kivlin

(57) ABSTRACT

An apparatus, system, and method for speeding up data transfers while reducing bus contention during repeated consecutive read-write operations. By reducing the length of time during which selected data pulses are driven on the memory bus, a higher percentage of usage of the memory bus may be attained without increasing the likelihood of bus contention and resulting degradation or damage to the memory system. The selected data pulse is preferably the write data pulse driven on the memory bus by the memory controller. A zero bus turnaround protocol may be implemented. The memory controller may include interface circuitry and write control circuitry that outputs an associated control signal to a three-state buffer. The three-state buffer, after being enabled by the associated control signal, drives write data on a data line of a memory bus. The turn-on delay associated with the three-state buffer exceeds the turn-off delay also associated with the three-state buffer. Thus, the three-state buffer drives data pulses on the data line for a shorter period of time than the period of time that the associated control signal is provided by the write control circuitry to enable the three-state buffer. The write control circuitry may output a shortened associated control signal. The associated control signal may be asserted for a shorter period than the memory controller clock period or the duration of a memory read data pulse. The write control circuitry may implement a turn-on delay or a shortened control signal which ends prior to the end of the memory controller clock pulse.

25 Claims, 8 Drawing Sheets

APPARATUS, SYSTEM, AND METHOD FOR REDUCING BUS CONTENTION DURING CONSECUTIVE READ-WRITE OPERATIONS

This application is a continuation of application Ser. No. 09/209,974, filed Dec. 10, 1998.

BACKGROUND OF THE INVENTION

1. Field of the Invention

This invention relates to electronic systems, and more particularly to a system and method for reducing bus contention during consecutive back-to-back read and write cycles.

2. Description of the Related Art

Electronic system performance bottlenecks have traditionally been associated with the core processing devices that are a part of the system, such as processors. Processors now operate at speeds of 300 MHz and higher with the ability to process multiple instructions per clock tick. Bottlenecks have thus shifted in many instances from the core processing devices themselves to the memory bus transfer mechanisms that accommodate data storage and transfers associated with the devices.

FIG. 1 is an block diagram of an embodiment of a typical computer system 100. The computing system 100 may be used in a variety of ways, as is well known in the art. A processor 110 is coupled to a system bus 115. An optional cache (not shown) is often coupled between the processor 110 and the system bus 115. A memory controller 120 is also coupled to the system bus 115. Memory requests to memory 130 by the processor 110 are received by the memory controller 120. Interface control circuit 121 in the memory controller 120 directs memory read and write cycles through input/output (I/O) cells 122. Write and read cycles are driven from the I/O cells 122 of the memory controller 120 through the memory bus 125 to the I/O cells 132 of the memory 130.

Bottlenecks can occur if the processor 110 requires access to memory 130 at rates that are greater than the maximum transfer rates associated the system bus 115 and/or the memory bus 125. The time it takes for the memory 130 to respond to a memory read or write cycle (i.e. the latency) also presents a bottleneck to data flow, if the processor has to wait for the memory to finish its read or write cycle before continuing processing.

For computer memories, in particular, moving from asynchronous memory types to synchronous memory types has shortened the latencies for data transfers. In both types of communication, the accurate transmission and reception of the data at a remote end is dependent on a sender and a receiver maintaining synchronization during the data transfer. The receiver must sample the signal in phase with the sender. If the sender and receiver were both supplied by exactly the same clock source, then transmission could take place forever with the assurance that signal sampling at the receiver is always in perfect synchronization with the transmitter. This is seldom the case, so in practice the receiver may be periodically brought into synch with the transmitter. It is left to the internal clocking accuracy of the transmitter and receiver to maintain sampling integrity between synchronization pulses.

In asynchronous communications, once called "start-stop" communications, each byte of data is potentially a separate unit. The sender can pause between any two bytes of a message. The receiver, however, may have to catch the data as quickly as it arrives. To accomplish this, asynchronous data require one extra bit's worth of time to announce the beginning of a new byte (the "start" bit) and one extra bit's worth of time at the end (the "stop" bit). Thus, a 2400-baud modem may transfer only 240 bytes of data per second, because each byte would require a minimum of 10 bits.

In synchronous communications, such as used by synchronous dynamic random access memory (SDRAM), the receiving clock is synchronized with the sending clock so the timing of the receiver and the timing of the sender are in synch. Data transfers may include multiple bytes of data in one transmission, such as a 'burst' or 'pipeline' mode transmission. Synchronous transfers save time in transmitting data by eliminating the start and stop bits for each byte of data.

One problem that still remains with some synchronous memory transfers is that dead clock cycles, sometimes called NOPs or wait states, must be provided on the address and/or data buses when transitioning from a read to a write, or from a write to a read. For example, both Late-Write (L-W) SRAM and Pipeline Burst (PB) SRAM can perform back-to-back read-read cycles or write-write cycles. L-W SRAM has one dead clock cycle on both the data and address buses for a transition from a read to a write. PB SRAM has two dead clock cycles on the data bus each time the data bus transitions from a write to a read. PB SRAM has two dead clock cycles on both the address and data buses each time the data bus transitions from a read to a write.

The industry responded to the problem of the dead clock cycles with the advent of ZERO-BUS TURNAROUND (ZBT) synchronous static random access memory (SRAM). The ZBT feature, an example of a zero bus turnaround protocol, is designed to optimize system performance in applications that frequently turn the memory data bus around, thus transitioning between reads and writes. Such applications invoke many random inter-mixed read and write operations on the data bus as opposed to bursts of read or writes. The ZBT SRAM, as with any memory that conforms to a zero bus turnaround protocol, is designed to improve performance by eliminating wasted cycles in-between memory read cycles and memory write cycles.

The general operation of ZBT SRAM is as follows. During a first clock cycle, address and control signal are presented to the memory inputs. One or two clock cycles later, the associated data cycle occurs, either a read or a write. The address and control lines and their operation are not shown herein as they are well known in the art. During each clock cycle, ZBT SRAM is reportedly capable of 100% bandwidth utilization during a long string of consecutive alternating read and write cycles, as is shown below in FIG. 3.

Important ZBT SRAM parameters include $t_{KHQX}$, $t_{KHQX1}$, and $t_{KHQZ}$. The parameter $t_{KHQX}$ represents the output hold time. This is the time that the data must be valid after the rising clock edge. Representative values for parameter $t_{KHQX}$ are 1.5 ns minimum to 3.5 ns maximum. The parameter $t_{KHQX1}$ represents the clock high to output active time. This is the minimum time from a rising clock edge before data can be output on the memory bus. Representative value for parameter $t_{KHQX1}$ is 1.5 ns. The parameter $t_{KHQZ}$ represents the clock high to data line high impedance. This is the time after a rising clock edge before the memory bus can be in a high impedance state. Representative values for parameter $t_{KHQZ}$ is 1.5 ns minimum and 3.5 ns maximum.

FIG. 2 illustrates a block diagram of an embodiment of prior art I/O cells 122A/132A for the memory controller 120 and the memory 130. The I/O cell group 200 shown in FIG. 2 represents the portion of the memory controller and memory that transfers a single bit of data. Thus, a plurality of such groups 200 is normally present in a memory system with a multiple byte wide memory bus.

I/O cell 122A of the memory controller includes a control signal TS input at 205, which controls a three-state buffer 210. The three-state buffer 210 drives the contents of the write register 220 onto the data line 125A of the memory bus 125. A bit to be written to memory is presented to the register at input 225 and latched to into the register 220 on the rising age of the clock signal (CLK) at input 236. A data bit read from the memory is received on the data line 125A and driven by read buffer 215 to a read register 230. The data bit is latched into the read register 230 on the rising edge of a clock signal and is available at output 235 for routing through the memory controller to a system bus.

I/O cell 132A of the memory includes a control signal OE input at 240, which controls a three-state buffer 245. Three-state buffer 245 drives the contents of the read register 255 onto the data line 125A of the memory bus 125. A bit to be read from memory is presented to the register at input IN 260 (from an internal memory array, not shown) and is latched into the register 255. Data to be written into memory is received on the data line 125A and driven by write buffer 250 to a write register 265. The data bit is latched into the write register 265 on the rising edge of a clock signal and is provided to the memory array at 270.

FIG. 3 illustrates an example timing diagram for a write-read-write-read data sequence during consecutive clock cycles for ZBT SRAM. For this example, the clock rate is 133 MHz. This clock rate has a clock period of 7.5 ns. From top to bottom, the signals shown are the clock, the controller write data signal W 310, which is presented at input 225 in FIG. 2, the controller control signal TS 315, which is presented at 205 in FIG. 2, and the read or write data signal 320 which is presented at data terminal t1 to the data line 125A. For this example, it is assumed that the address and control signals are presented one or more clock cycles ahead of the respective read or write.

Prior to clock cycle 301, the controller provides write data at input W 225. During clock cycle 301, the controller asserts control signal TS at 205, and a write data pulse 340 is driven on the data line 125A. The length of each data pulse is a full 7.5 ns (i.e. the entire duration of the clock pulse). The controller signals nominally start and stop at the beginning and end of each clock pulse. Delays inherent in the memory controller lead to a nominal delay in the start of the write data pulse 340 on the data line 125A and lead to the data pulse ending an equal time after the end of the clock cycle 301.

During clock cycle 302, the memory is outputting read data. The read data pulse 350 is also driven onto the data line after a short delay. This short delay means that the read data pulse 350 is driven on the data line starting slightly after the start of the clock cycle 302 and ending at slightly past the end of the clock cycle 302.

During clock cycle 303, the controller again inputs write data at input W 225, the controller outputs control signal TS at 205, and a write data pulse 360 is driven on the data line 125A. The start of the write data pulse 360 is again delayed from the 15.0 ns start of the clock cycle 303. The write data pulse 360 does not end until after the end of clock cycle 303.

Another read cycle occurs during clock cycle 304. The read data pulse 370 is also driven onto the data line after a short delay. This short delay means that the read data pulse 370 is driven on the data line starting slightly after the start of the clock cycle 304 and ending at slightly past the end of the clock cycle 304.

Although ZBT SRAM is designed for consecutive back-to-back read and write cycles, contention may still occur on the memory data bus. For example, if a write data pulse is driven on the data line for too long past the end of the clock cycle, or if a consecutive a read data pulse is driven on the data line too soon, then bus contention can occur. Skew between the memory controller clock and the memory clock may lead to bus contention. Variability in manufacturing processes may also lead to bus contention since the timing parameters for the memory and the memory controller may not be precisely the same.

The primary concern with bus contention (i.e. when the memory controller is driving data on the data line at the same time the memory is driving data on the data line) is overcurrent through the electronics comprising the memory system. Overcurrent occurs when the opposite ends of the bus are being pulled in opposite electrical directions. For example the controller may be driving a logic zero on the bus at the same time the memory is driving a logic one. Thus, the controller three-state buffer is driving the bus low to ground while the ZBT SRAM three-state buffer is driving the bus high.

Parasitic impedance will limit the actual current, but the value of this current will be significantly higher than during the non-overlapping sequence. Under these conditions, there is an effective short circuit between the high voltage and the ground. It has been determined that the worst-case scenario would be the controller driving a logical zero while the ZBT SRAM drives a logical one, assuming that the memory drives more current and switches on faster than the memory controller. The number of bit lines in the bus magnifies this situation. These high currents can generate noise impulses and overheating in the memory controller and/or the memory. The noise effects can be difficult to diagnose when the system is operational and may not surface until a specific combination of device process variations occur together.

It would thus be desirable to have an apparatus, system, and method for speeding up data transfers while reducing bus contention during consecutive, back-to-back read-write operations. The apparatus, system, and method are preferably compatible with existing memory systems with minimal changes to hardware.

SUMMARY OF THE INVENTION

The problems outlined above are in large part solved by an apparatus, system, and method for precisely controlling the timing of data transfers while reducing bus contention during consecutive read-write operations. By reducing the length of time during which selected data pulses are driven on the memory bus, a higher percentage of usage of the memory bus may be attained without increasing the likelihood of bus contention and resulting degradation or damage to the memory system. The selected data pulse is preferably the write data pulse driven on the memory bus by the memory controller. In various embodiments, a zero bus turnaround protocol is implemented.

In one embodiment, a memory controller may include interface circuitry and write control circuitry that outputs an associated control signal to a three-state buffer. The three-state buffer, after being enabled by the associated control signal, drives write data on a data line of a memory bus. The turn-on delay associated with the three-state buffer exceeds the turn-off delay also associated with the three-state buffer.

Thus, the three-state buffer drives the write data pulse on the data line for a shorter period of time than the period of time that the associated control signal provided by the write control circuitry is asserted to enable the three-state buffer. This feature may advantageously result in reducing bus contention while requiring minimal modification to the memory controller circuitry.

In another embodiment, a memory controller may include write control circuitry that outputs an associated control signal and a three-state buffer which is enabled by the control signal to drive write data on a data line of a memory bus. The write control circuitry outputs the associated control signal for a shorter period of time than the memory controller clock period or for a shorter period of time than the duration of a memory read data pulse (generated on the memory bus by the memory). The write control circuitry may delay asserting the control signal for a period of time after the start of a memory controller clock pulse to thereby delay the time at which write data is provided to the memory bus through the three-state buffer and/or may deassert the control signal at a predetermined time prior to the end of the memory controller clock pulse to thereby discontinue the drive of write data on the memory bus. The memory controller may advantageously attain reduced bus contention while requiring relatively few changes in the overall system design.

BRIEF DESCRIPTION OF THE DRAWINGS

Other objects and advantages of the invention will become apparent upon reading the following detailed description and upon reference to the accompanying drawings in which.

Figure 1:
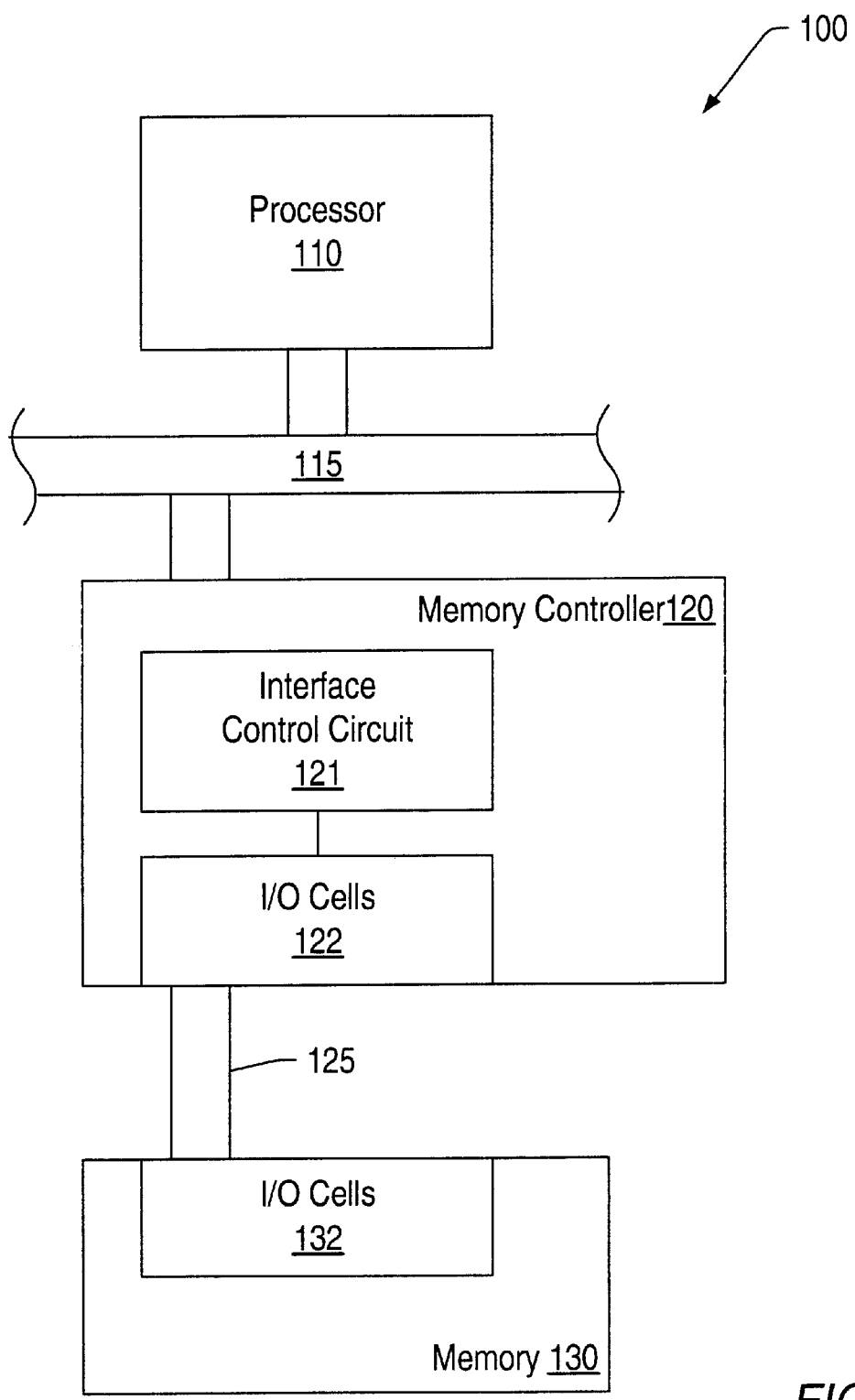
FIG. 1 is a block diagram of an embodiment of a typical computer system.
Figure 2:
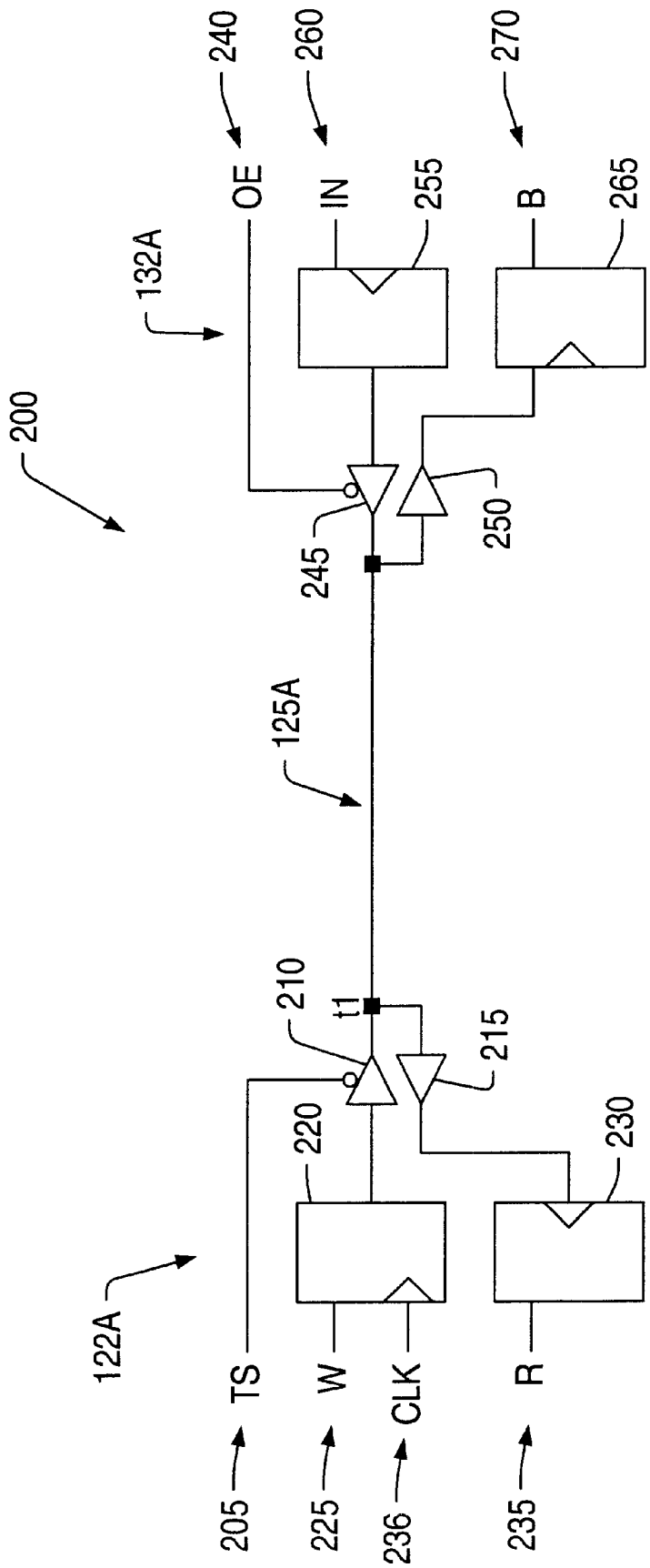
FIG. 2 is a block diagram of an embodiment of prior art input/output cells for a memory controller and a memory.
Figure 3:
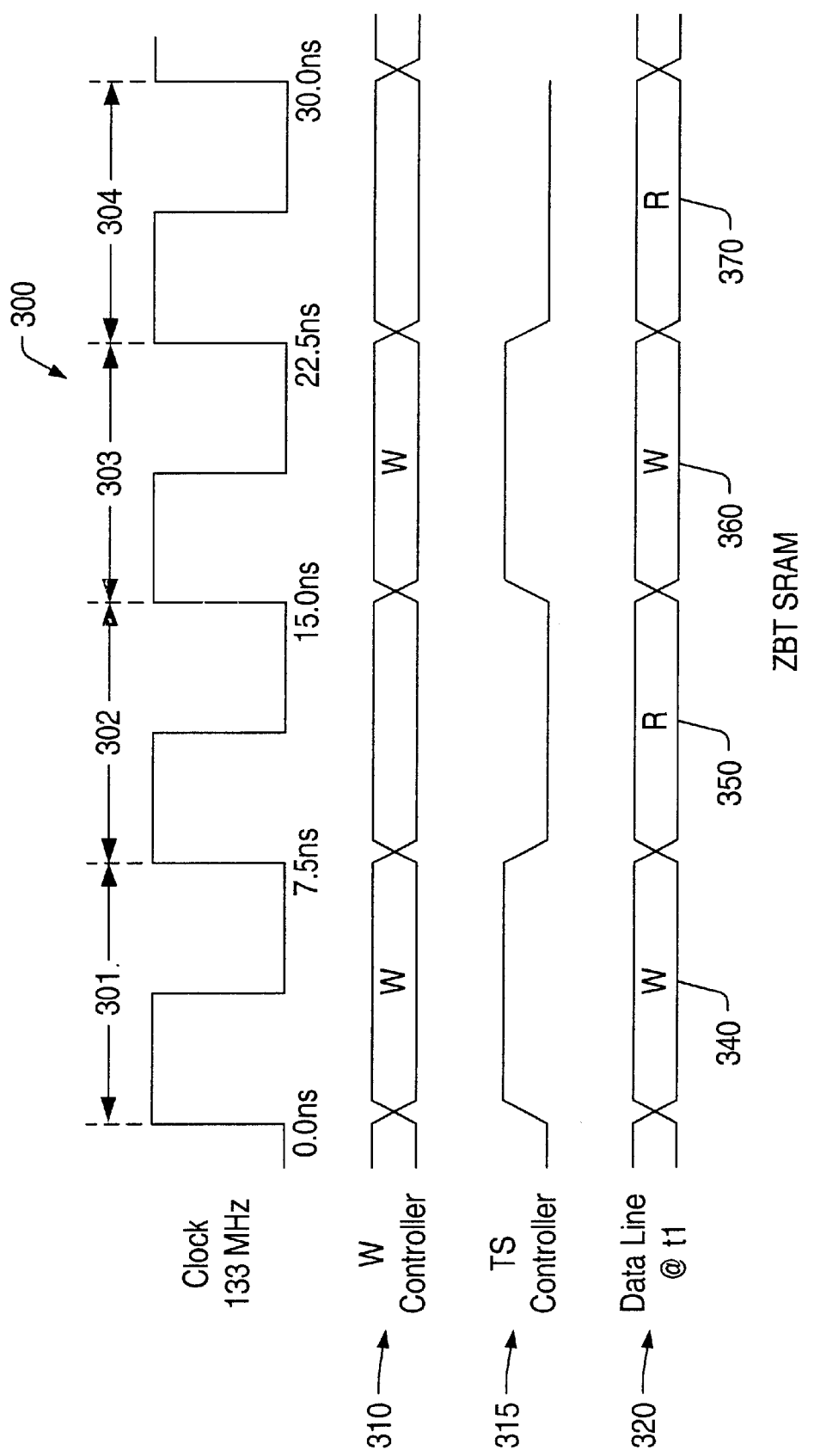
FIG. 3 is an example timing diagram for a write-read-write-read data sequence during consecutive clock cycles for prior art ZBT SRAM.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

With the advent of synchronized memory, timing synchronization between the memory controller and the memory has become more important. With clock rates for system devices, such as memory, reaching 100 MHz and above, timing delays or skew associated with the system clock and the clock inputs of the system devices can be substantial. In any system where timing is critical the system clocking should be as uniform as possible.

Figure 4:
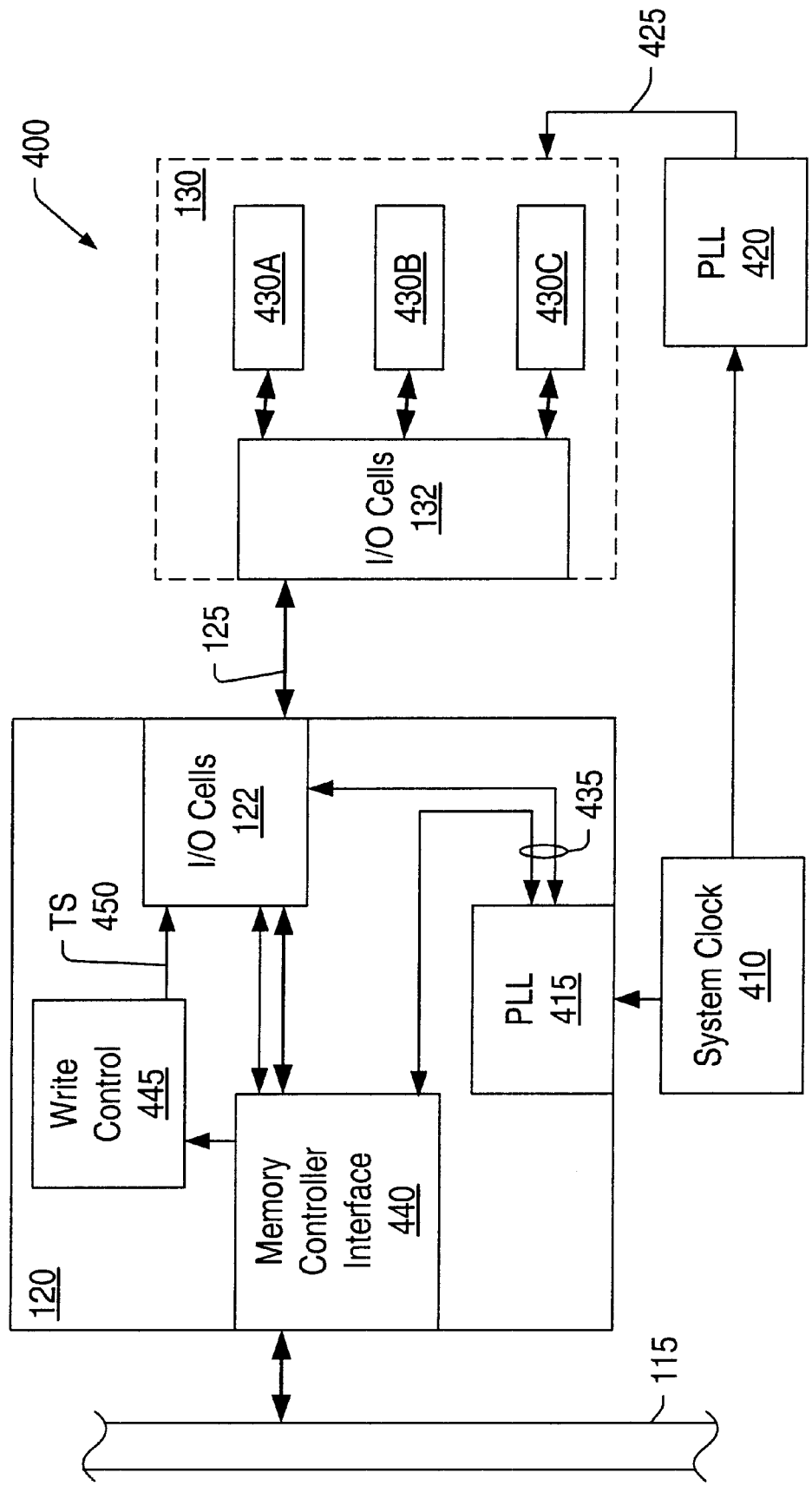
FIG. 4 is a block diagram of an embodiment of a memory system having dual phase locked loops for synchronized timing.

Turning to FIG. 4, a block diagram of an embodiment of a memory system 400 having dual phase locked loops for synchronized timing is illustrated. The memory controller 120 receives the clock signal output from the system clock 410 at a phase locked loop (PLL) 415. The operation of PLLs is well known in the art and will not be detailed herein. This PLL 415 is preferably internal to the memory controller. The memory controller 120 uses the output of the PLL 415 to keep all portions of the memory controller 120, including I/O cells 122, running on a uniform clock, referred to as the "memory controller clock" 435. The PLL 415 preferably maintains the phase of the memory controller clock 435 at the phase of the system clock 410.

As shown, the memory controller 120 includes memory controller interface circuitry 440 coupled to exchange data with a system bus 115 and with the memory controller I/O cells 122. The memory controller interface circuitry 440 further outputs control signals to write control circuitry 445, as well as the I/O cells 122. The write control circuitry 445 asserts a control signal TS 450, associated with a memory write cycle, to the I/O cells 122.

The memory 130 is comprised of a memory array 430, including memory cells in memory units (or banks) 430A–430C, and memory I/O cells 132. The memory 130 accepts the output of a second PLL 420. The second PLL 420 may be integral to the memory 130 or external to the memory 130. The second PLL 420 also maintains the phase of the memory clock 425 at the phase of the system clock 410. Data are exchanged between the memory controller 120 and the memory 130 over the memory bus 125.

The memory read and write operations of the memory system 400 are completely synchronized. The phase of the memory controller clock 435 and the phase of the memory clock 425 are kept in phase by the PLL 415 and the second PLL 420. In another embodiment, a predetermined phase angle difference, or skew, is set between the memory controller clock 435 and the memory clock 425. In one embodiment, the memory controller 120 and the memory 130 are configured to implement a zero bus turnaround protocol. In one embodiment, the memory is ZBT SRAM (zero bus turnaround synchronous static random access memory).

Figure 5:
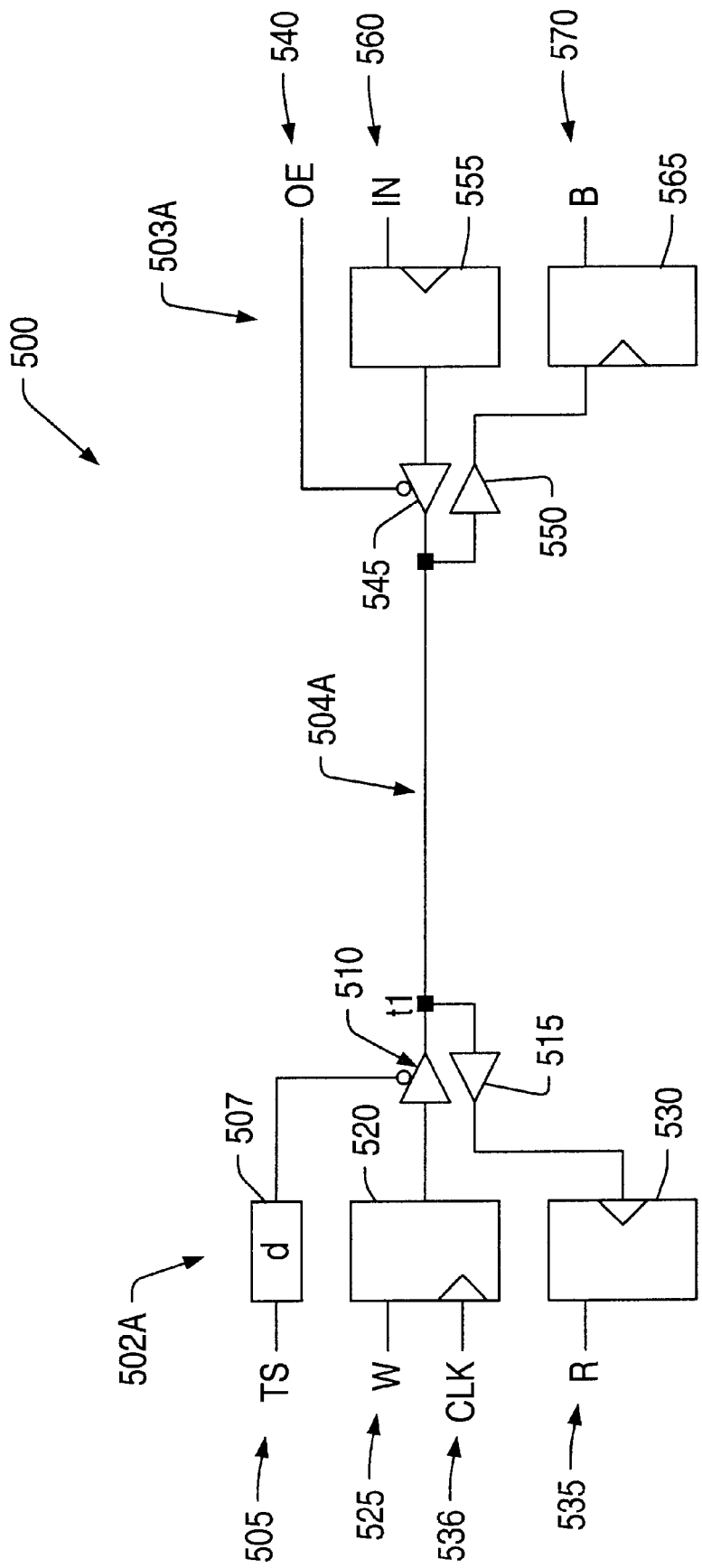
FIG. 5 is a block diagram of an embodiment of input/output cells for a memory controller and a memory.

FIG. 5 illustrates a block diagram of an embodiment of individual I/O cells 502A/503A for a memory controller 120 and a memory 130. The I/O cell pair 500 shown in FIG. 5 represents the portion of the memory controller 120 and memory 130 that transfers a single bit of data. Thus, a plurality of such pairs 500 is normally present in a memory system 400 with a multiple byte wide memory bus 125. It is noted that the embodiments and description of the actual electronics that comprise the memory controller 120 and the memory 130 are exemplary only and that other components and arrangements are contemplated.

I/O cell 502A of the memory controller 120 receives at input 505 the control signal TS 450, which controls a three-state buffer 510. The three-state buffer 510 drives the contents of the write register 520 onto the data line 504A of the memory bus 125. A bit to be written to memory 130 is presented to the register 520 at input 525 and is latched into the register 520 on the rising age of the memory controller clock signal 435 (CLK) at input 536. A data bit read from the memory 130 is received on the data line 504A and driven by read buffer 415 to a read register 430. The data bit is latched into the read register 530 on the rising edge of the memory controller clock signal 435 and is provided through output 535 to, for example, the system bus 115 through the memory controller interface circuitry 440.

I/O cell 503A of the memory 130 receives at input 540 a control signal OE generated by control circuitry (not shown) associated with memory 130. Control signal OE controls a three-state buffer 545. Three-state buffer 545 drives the contents of the read register 555 onto the data line 504A of the memory bus 125. A bit to be read from memory 130 is presented to the register 555 at input IN 560 and latched into the register 555 on a rising edge of the memory clock 425. A datum that is to be written into memory 130 is received on the data line 504A and is driven by write buffer 550 to a write register 565. The data bit is latched into the write register 565 on a rising edge of the memory clock 425 and is provided to the memory array 430 at input 570.

Figure 6A:
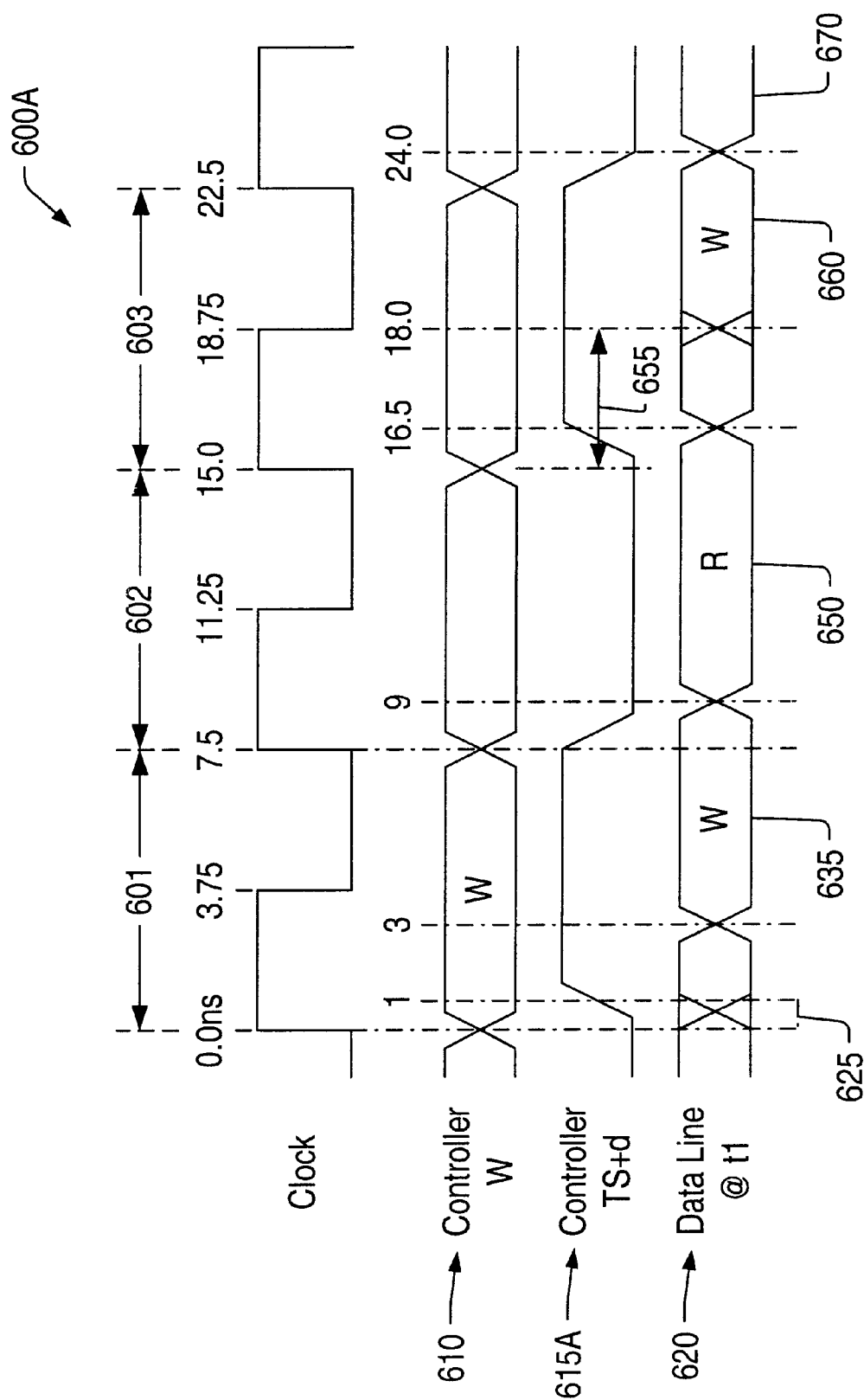
FIGS. 6A, 6B, and 6B are example timing diagrams for a write-read-write data sequence during consecutive clock cycles.
Figure 6B:
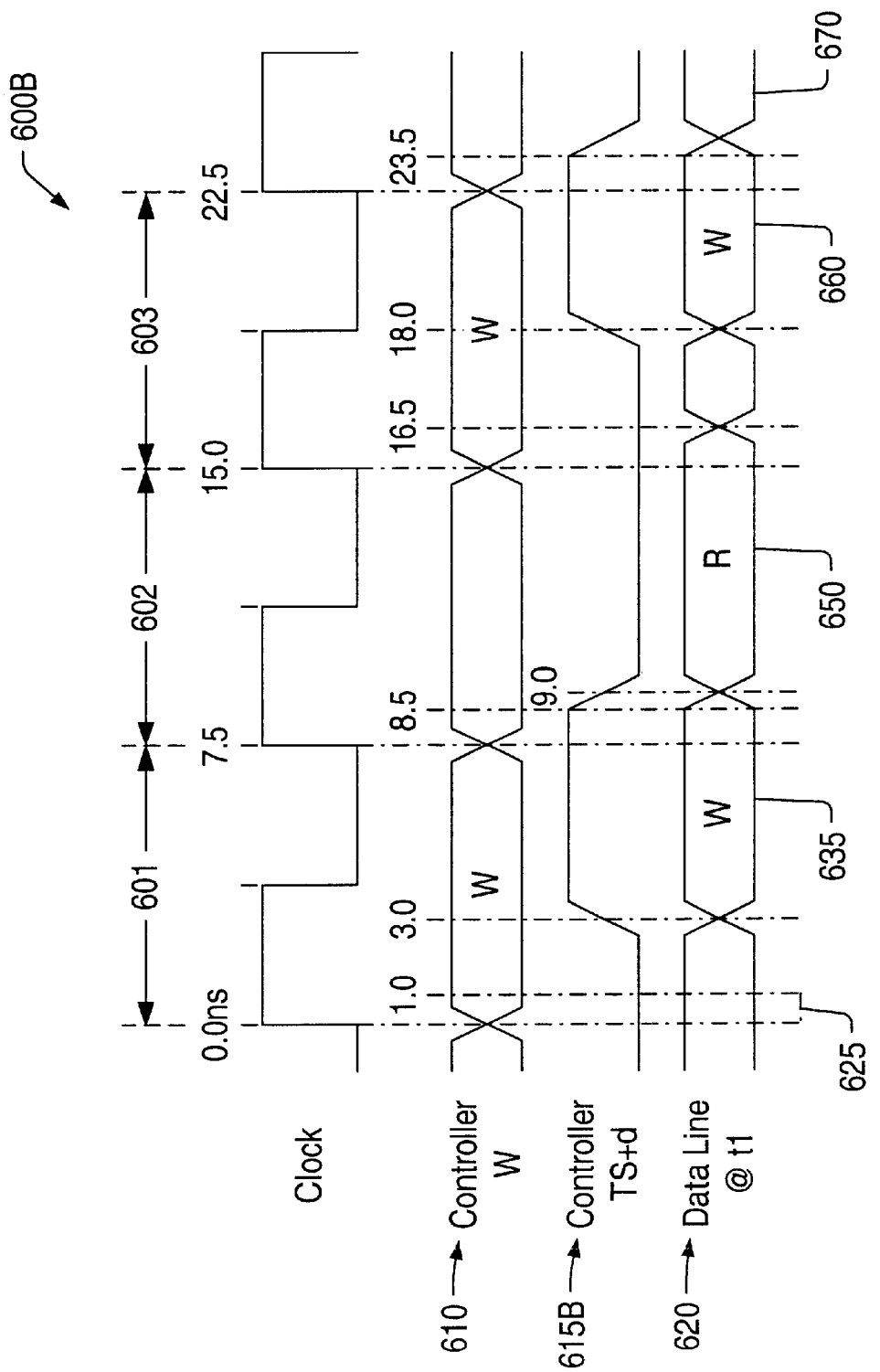
Figure 6C:
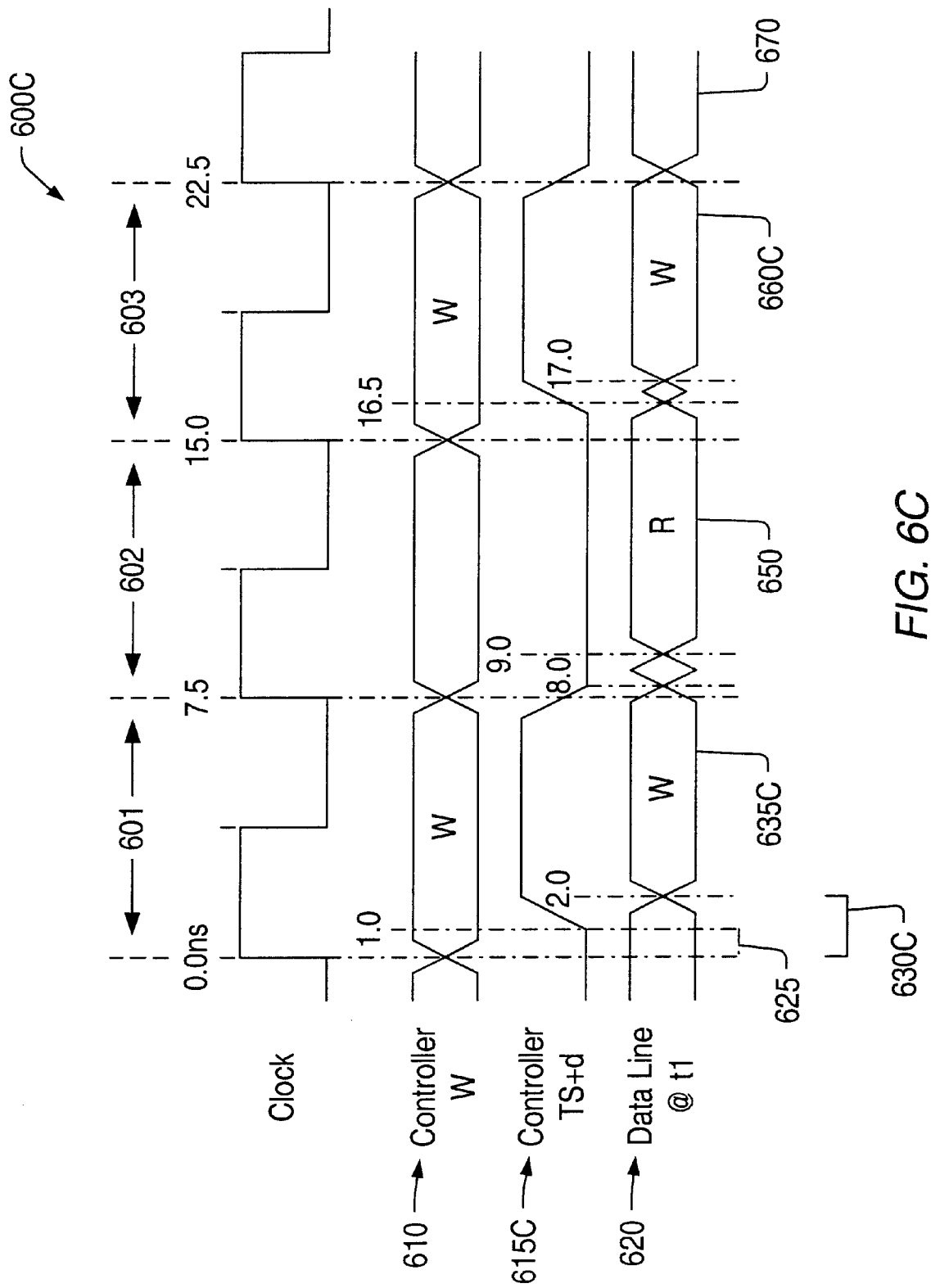

FIGS. 6A, 6B, and 6C illustrate exemplary timing diagrams 600A, 600B, and 600C for a write-read-write data sequence during consecutive clock cycles for various embodiments. For these examples, the memory controller and memory clock rates are 133 MHz. A clock rate of 133 MHz equates to a clock period of 7.5 ns. From top to bottom, the signals shown are the memory controller clock 435, the controller write signal W 610, which is presented at input 525 in FIG. 5, the effective controller control signal TS+d 615, incorporating control signal TS 450 presented at 505 in FIG. 5 with delay "d" illustrated at 507, and the read or write data signal 620 presented at data terminal t1 to the data line 504A. For these examples, it is assumed that the address and control signals are presented one or more clock cycles ahead of the respective read or write data phases.

In timing diagram 600A of FIG. 6A, prior to clock cycle 601, the memory controller 120 provides write data at input W 525. During clock cycle 601, the write data input at W 525 is held in write buffer 520 for 7.5 ns, the width of the memory controller clock signal 435. Also during clock cycle 601, the memory controller 120 asserts control signal TS 450 at input 505, as shown at 615A. The control signal TS 450 is delayed by "d" at 507 and presented to the three-state buffer 510 approximately 1.0 ns later. Delay "d" represents the inherent signal propagation delay associated with the routing of the control signal TS 450 in a fan-out fashion to the plurality of I/O cells 502. In this embodiment of memory controller 120, three-state buffer 510 is fabricated such that its turn-on delay is longer than its associated turn-off delay. For the illustrated implementation, the turn-on delay of the three-state buffer 510 thus delays the start of the write bit data pulse 635 on the data line 504A until approximately 3.0 ns after the start of the memory write phase. The write data pulse 635 thus begins on the data line 504A at 3.0 ns. Since the turn-off delay associated with the three-state buffer 510 is relatively short in comparison to its turn-on delay, upon the falling edge of the control signal TS 450 (TS+d), the three-state buffer 510 will turn off. As illustrated, the write data pulse width 635 thus ends after 6.0 ns at 9.0 ns (or a short time thereafter, depending upon the turn-off delay of the three-state buffer 510. It is noted that this occurs 1.5 ns after the end of the clock cycle 601. It is also noted that the width of the control signal TS 450 as shown at 615A is 7.5 ns, while the write data pulse 635 driven on the data line 504A is only approximately 6 ns.

During clock cycle 602, the memory 130 is outputting read data. The read data pulse 650 cannot be driven onto the data line until at least time $t_{KHQX1}$ has passed, or 1.5 ns (per timing specifications associated with an exemplary memory). This time delay means that the read data pulse 650 is driven on the data line starting at 9.0 ns and ending at 16.5 ns, or 1.5 ns past the end of the clock cycle 602. Since the write data pulse 635 of clock cycle 601 has ended at 9.0 ns, no bus contention should occur.

Prior to clock cycle 603, the memory controller 120 provides write data at input W 525. During clock cycle 603, the write data input at W 525 is again held in write buffer 520. Also during clock cycle 603, the memory controller 130 control circuit 445 again asserts control signal TS 450 at input 505. A write data pulse 660 is driven on the data line 504A starting at 18.0 ns, 3.0 ns after the start of the clock cycle 603. Since the previous read cycle 650 ended at 16.5 ns, no bus contention should occur. In the embodiment shown, the write data pulse ends after 6.0 ns at 24.0 ns. It is noted that this is again 1.5 ns after the end of the 603 clock cycle. Since a new read data pulse 670 cannot start until 1.5 ns after the start of a clock cycle, no bus contention should occur.

In accordance with the embodiment described above in conjunction with FIG. 6A, since the turn-on delay associated with the three-state buffer 510 is shorter than its associated turn-off delay, write data pulses 635/660 are driven on the memory bus for a shorter duration of time than the duration of time during which the control signal TS 450 is asserted, and write data pulses 635/660 do not appear on the memory bus 125 as quickly in comparison to configurations with short turn-on delays. Therefore, the memory controller 120 may advantageously avoid contention with a read data pulse 650 (at the end of the corresponding read cycle) being driven on the memory bus 125 by the memory 130.

The operation of an alternative embodiment of controller 120 is illustrated in FIG. 6B. In the timing diagram 600B of FIG. 6B, prior to clock cycle 601, the memory controller 120 provides write data at input W 525. During clock cycle 601, the write data input at W 525 is held in write buffer 520. Also during clock cycle 601, the memory controller 120 asserts control signal TS 450 at input 505, as shown at 615B, starting at approximately 2.0 ns. The control signal TS 450 is delayed by "d" at 507 and presented to the three-state buffer 510 1.0 ns later. In this embodiment of the memory controller 120, the control signal TS 450 is asserted for a shorter duration of time than the memory controller clock pulse period 435 or the memory read data pulse 425. The control signal TS 450 is delayed for a time after the start of the memory controller clock cycle 601. For the illustrative implementation, the start of the control signal TS 450 is delayed for approximately 2 ns after the start of the memory write phase. As illustrated, the write data pulse 635 thus begins on the data line 504A at 3.0 ns. The write data pulse width 635 ends after 6.0 ns at 9.0 ns (or a short time thereafter). It is noted that this occurs 1.5 ns after the end of the clock cycle 601. It is also noted that the width of the control signal TS 450 as shown at 615B is 6.0 ns, the same as the duration of the memory write data pulse 635.

During clock cycle 602, the memory 130 is outputting read data. The read data pulse 650 cannot be driven onto the data line 504A until at least time $t_{KHQX1}$ has passed, or 1.5 ns. This time delay means that the read data pulse 650 is driven on the data line 504A starting at 9.0 ns and ending at 16.5 ns, or 1.5 ns past the end of the clock cycle 602. As the write data pulse 635 of clock cycle 601 has ended at 9.0 ns, no bus contention should occur.

Prior to clock cycle 603, the memory controller 120 provides write data at input W 525. During clock cycle 603, the write data input at W 525 is again held in write buffer 520. In addition, during clock cycle 603, the memory controller 130 control circuit 445 again asserts control signal TS 450 at input 505. A write data pulse 660 is driven on the data line 504A starting at 18.0 ns, 3.0 ns after the start of the clock cycle 603. Since the previous read cycle 650 ended at 16.5 ns, no bus contention should occur. In the embodiment shown, the write data pulse of clock cycle 603 ends after 6.0 ns at 24.0 ns. It is noted that this is again 1.5 ns after the end of the 603 clock cycle. Since a new read data pulse 670 cannot start until 1.5 ns after the start of a clock cycle, no bus contention should occur.

In accordance with the embodiment described above in conjunction with FIG. 6B, since the memory controller 120 delays assertion of the control signal TS 450, and asserts control signal TS 450 for a duration of time less than the duration of a memory controller clock cycle 435 or the duration of a memory read cycle (such as shown at 650), contention with the end of a read data pulse 650 being driven on the memory bus 125 by the memory 130 may advantageously be avoided.

A further embodiment of memory controller 120 is illustrated in FIG. 6C. In the timing diagram 600C of FIG. 6C, prior to clock cycle 601, the memory controller 120 provides write data at input W 525. During clock cycle 601, the write data input at W 525 is held in write buffer 520 for 7.5 ns. Also during clock cycle 601, the memory controller 120 asserts control signal TS 450 at input 505, as shown at 615C. The control signal TS 450 is delayed by "d" at 507 and presented to the three-state buffer 510 approximately 1.0 ns later. In this embodiment of the memory controller 120, the control signal TS 450 is asserted for a shorter duration of time than the memory controller clock pulse period 435 or the memory read data pulse 650. The control signal TS 450 is slightly delayed for a time after the start of the memory controller clock cycle 601 and ends in less than the duration of the memory controller clock cycle 435. For the illustrative implementation, the start of the control signal TS 450 is delayed for approximately 1 ns after the start of the memory write phase and ends after a duration of approximately 6 ns. As illustrated, the write data pulse 635C thus begins on the data line 504A at 2.0 ns. The write data pulse width 635C is again shorter than the 7.5 ns clock pulse width. In the embodiment shown, the write data pulse 635C ends after 6.0 ns at 8.0 ns. It is noted that this is 0.5 ns after the end of the clock cycle 601. It is also noted that the width of the control signal TS 450 as shown at 615C is 6.0 ns, the same as the width of the memory write pulse 635C on the data line 504A.

During clock cycle 602, the memory 130 is outputting read data. The read data pulse 650 cannot be driven onto the data line until at least time $t_{KHQX1}$ has passed, or 1.5 ns. This time delay means that the read data pulse 650 is driven on the data line starting at 9.0 ns and ending at 16.5 ns, or 1.5 ns past the end of the clock cycle 602. As the write data pulse 635 of clock cycle 601 has ended at 8.0 ns, no bus contention should occur.

Prior to clock cycle 603, the memory controller 120 provides write data at input W 525. During clock cycle 603, the write data input at W 525 is again held in write buffer 520. In addition, during clock cycle 603, the memory controller 130 control circuit 445 again asserts control signal TS 450 at input 505. A write data pulse 660 is driven on the data line 504A starting at 17.0 ns, 2.0 ns after the start of the clock cycle 603. Since the previous read cycle 650 ended at 16.5 ns, no bus contention should occur. As shown, the write data pulse 660C ends after 6.0 ns at 23.0 ns. It is noted that this is again 0.5 ns after the end of the 603 clock cycle. As a new read data pulse 670 cannot start until 1.5 ns after the start of a clock cycle, no bus contention should occur.

In accordance with the embodiment described above in conjunction with FIG. 6C, since the memory controller 120 delays assertion of the control signal TS 450 and asserts control signal TS 450 for a duration of time less than the duration of a memory controller clock cycle 435 or the duration of a memory read cycle (such as shown at 650), the memory write cycle ends prior to the initiation of a succeeding memory read cycle on the memory bus 125 by the memory 130 and starts after the end of a preceding memory read cycle. Therefore, the memory controller 120 may advantageously avoid contention with both the start and the end of a read data pulse 650 being driven on the memory bus 125 by the memory 130.

It is noted that in the above-described embodiments, specific timing parameters are illustrated. These specific timing parameters may vary in other embodiments. For example, the specific timing parameters associated with the turn-on delay and/or the turn-off delay of the three-state buffer 510 may vary in different embodiments. In certain preferred embodiments, the turn-on delay is at least twice as long as the turn-off delay. Similarly, the duration of the shortened write data pulses may vary form embodiment to embodiment. In certain preferred embodiments, the write data pulses are 90 percent or smaller of the width of the memory controller clock pulse width and/or 90 percent or smaller of the width of a corresponding read data pulse driven on the memory bus by the memory. It is also noted that memory systems may have multiple clock signals available with differing clock periods. In one embodiment, the highest frequency clock signal available, that is, the clock signal with the shortest clock period, is used for timing in the memory controller.

Numerous variations and modifications will become apparent to those skilled in the art once the above disclosure is fully appreciated. It is intended that the following claims be interpreted to embrace all such variations and modifications.

What is claimed is:

1. A memory system, comprising:
    a data line of a memory bus;
    a memory coupled to the data line; wherein the memory is configured to store data;
    a memory controller configured to control accesses to the memory, wherein the memory controller includes:
        a data terminal for connecting to the data line; and
        a three-state buffer having an output coupled to the data terminal and an input coupled to receive data to be driven on the data line, wherein a turn-on delay associated with the three-state buffer exceeds a turn-off delay associated with the three-state buffer, whereby a duration of a data pulse on the data line by the three-state buffer is less than approximately 90 percent of the duration of an associated control signal provided to enable the three-state buffer.

2. The memory system of claim 1, wherein the turn-on delay is at least twice as long as the turn-off delay.

3. The memory system of claim 1, wherein the memory system implements a zero bus turnaround protocol.

4. The memory system of claim 1, wherein the memory controller further comprises:
    memory controller interface circuitry coupled to provide data from a system bus to the three-state buffer to be driven on the data line; and
    write control circuitry coupled to the memory controller interface circuitry, wherein the write control circuitry asserts the associated control signal provided to enable the three-state buffer.

5. The memory system of claim 1, wherein the memory comprises: memory input/output (I/O) cells coupled to receive data driven on the data line by
the three-state buffer; and
a memory array coupled to the memory I/O cells for storing the data received by the memory I/O cells from the three-state buffer; and wherein the memory controller is further configured to control accesses to the data stored in the memory array.

6. A memory system, comprising:
a data line of a memory bus;
a memory coupled to the data line; wherein the memory is configured to store data;
a memory controller configured to control accesses to the memory, wherein the memory controller includes:
a three-state buffer configured to selectively drive data on the data line depending
upon an associated control signal; an output storage element configured to temporarily store data to be driven on the
data line through the three-state buffer, wherein the output storage element
is further configured to store the data in response to a clock signal; and a control circuit configured to generate the control signal with a pulse width that
is less than approximately 90 percent of a period of the clock signal.

7. The memory system of claim 6, wherein the memory system further comprises:
a first phase locked loop (PLL) coupled to receive a system clock signal, wherein the first
PLL synchronizes a memory controller clock signal to the system clock signal,
wherein the first PLL is configured to output the memory controller clock signal
as the clock signal; and
a second PLL coupled to receive the system clock signal, wherein the second PLL
synchronizes a memory clock signal to the a system clock signal, wherein the
second PLL is configured to output the memory clock signal to the memory.

8. The memory system of claim 7, wherein a phase of the second PLL is skewed with respect to the first PLL.

9. The memory system of claim 7, wherein the first PLL is integrated with the memory controller on a common integrated circuit chip.

10. A memory system, comprising:
a data line of a memory bus;
a memory coupled to the data line; wherein the memory is configured to store data,
wherein the memory is configured to drive read data in the form of a read data
pulse on the data line in response to a memory read cycle;
a memory controller configured to control accesses to the memory, wherein the memory controller includes:
a three-state buffer configured to selectively drive data on the data line depending upon an associated control signal;
an output storage element configured to temporarily store data to be driven on the
data line through the three-state buffer; and
a control circuit configured to generate the associated control signal with a pulse width that is less than approximately 90 percent of a width of the read data pulse.

11. The memory system of claim 10, wherein the memory system is configured to operate at a predetermined clock rate with a predetermined period of a clock cycle, wherein the width of the read data pulse driven on the data line by the memory is approximately equal width to the predetermined period of the clock cycle.

12. The memory system of claim 10, wherein the memory system implements a zero bus turnaround protocol.

13. A memory system, comprising:
means for driving read data on a memory bus in response to a memory read cycle;
means for receiving the read data driven on the memory bus by the means for driving read data; and
means for driving write data on the memory bus, wherein a duration of time during which
the write data are driven on the memory bus is less than approximately 90 percent
of the duration of time during which the read data are driven on the memory bus.

14. The memory system of claim 13, wherein the memory system is configured to implement a zero bus turnaround protocol.

15. A computer system, comprising:
a data line of a memory bus;
a memory coupled to the data line; wherein the memory is configured to store data;
a memory controller configured to control accesses to the memory, wherein the memory controller includes:
a data terminal configured to connect to the data line; and
a three-state buffer having an output coupled to the data terminal and an input coupled to receive data to be driven on the data line, wherein a turn-on delay associated with the three-state buffer exceeds a turn-off delay associated with the three-state buffer, whereby a duration of a data pulse on the data line by the three-state buffer is less than approximately 90 percent of the duration of an associated control signal provided to enable the three-state buffer;
a system bus, wherein the memory controller is coupled to the system bus; and
a processor coupled to the system bus, wherein the processor is configured to access data stored in the memory through requests to the memory controller.

16. The memory system of claim 15, wherein the turn-on delay is at least twice as long as the turn-off delay.

17. The memory system of claim 15, wherein the memory system is configured to implement a zero bus turnaround protocol.

18. The memory system of claim 15, wherein the memory controller further comprises:
memory controller interface circuitry coupled to provide data from the system bus to the three-state buffer to be driven on the data line; and
write control circuitry coupled to the memory controller interface circuitry,
wherein the write control circuitry asserts the associated control signal provided to enable the three-state buffer.

19. The memory system of claim 15, wherein the memory comprises:
memory input/output (I/O) cells coupled to receive data driven on the data line by the three-state buffer; and a memory array coupled to the memory I/O cells for storing the data received by the memory I/O cells from the three-state buffer; and wherein the memory controller is further configured to control accesses to the data stored in the memory array.

20. A method for operating a memory system including a data line of a memory bus, a memory coupled to the data line and configured to store data, and a memory controller coupled to the data line and configured to control accesses to the memory, the method comprising:

the memory driving read data in the form of a read data pulse on the data line in response to a memory read cycle;

the memory controller receiving the read data driven on the data line by the memory; and the memory controller driving write data on the data line after receiving the read data, wherein a duration of time during which the write data is driven on the data line by the memory controller is less approximately 90 percent of the duration of the duration of the read data pulse.

21. The method as recited in claim 20, further comprising:

the memory controller selectively driving the write data on the data line depending upon an associated control signal; and the memory controller generating the control signal with a pulse width that is less than approximately 90 percent of the duration of the duration of the read data pulse.

22. The method of claim 20, wherein the memory controller drives the write data on the data line in response to a memory write cycle.

23. The method of claim 22, wherein the memory write cycle occurs during a consecutive clock cycle immediately following the memory read cycle.

24. The method of claim 22, wherein the memory read cycle occurs during a consecutive clock cycle immediately following the memory write cycle.

25. The method of claim 20, wherein the memory system implements a zero bus turnaround protocol.

* * * * *